(12) United States Patent
Rees et al.

(10) Patent No.: US 11,541,628 B2
(45) Date of Patent: Jan. 3, 2023

(54) NEEDLE-PUNCHED STRUCTURES CONTAINING RECYCLED FIBERS

(71) Applicant: ENGINEERED FLOORS LLC, Dalton, GA (US)

(72) Inventors: John Joseph Matthews Rees, Chattanooga, TN (US); Stephen Tsiarkezos, Elkton, MD (US)

(73) Assignee: ENGINEERED FLOORS LLC, Dalton, GA (US)

( * ) Notice: Subject to any disclaimer, the term of this patent is extended or adjusted under 35 U.S.C. 154(b) by 386 days.

(21) Appl. No.: 16/806,506

(22) Filed: Mar. 2, 2020

(65) Prior Publication Data

US 2020/0276788 A1 Sep. 3, 2020

Related U.S. Application Data

(60) Provisional application No. 62/812,380, filed on Mar. 1, 2019.

(51) Int. Cl.
*B32B 37/24* (2006.01)
*B32B 38/06* (2006.01)
(Continued)

(52) U.S. Cl.
CPC .................. *B32B 5/16* (2013.01); *B32B 5/06* (2013.01); *B32B 5/26* (2013.01); *B32B 5/266* (2021.05);
(Continued)

(58) Field of Classification Search
CPC ......... B32B 5/022; B32B 5/024; B32B 5/026; B32B 5/028; B32B 5/06; B32B 5/08;
(Continued)

(56) References Cited

U.S. PATENT DOCUMENTS 3,199,167 A * 8/1965 Charlton, Jr. ...... B01D 39/1607
28/112
6,066,388 A * 5/2000 Van Kerrebrouck ........................
D04H 1/5418
442/403

(Continued)

OTHER PUBLICATIONS

International Search Report and Written Opinion in corresponding/related International Application No. PCT/US20/20641 dated May 12, 2020. (All references not cited herewith have been previously made of record.).

(Continued)

*Primary Examiner* — Michael A Tolin
(74) *Attorney, Agent, or Firm* — Patent Portfolio Builders PLLC

(57) ABSTRACT

Textiles are re-cycled by grinding and scatter-laying onto a needle-punched web optionally containing low-melting material, followed by laying a second needle-punched web over the scattered layer and re-needling the three layers before applying heat or heat and pressure to activate the low-melting ground material present within the layers. Additional low-melt ground material is optionally blended into the ground textile if low melt components are absent or insufficient to bond the composite. The ground material is driven and dispersed into the surrounding web layers with at least part of the material being adjacent the two outer surfaces. The physical properties of the composite can be adjusted by selecting suitable combinations including but not limited to needling stroke depth, needling density, needle gage, low-melt content, heat finishing conditions, and relative layer weights. The final composites can optionally be reintroduced into the original end use and include significant percentages of recycled material.

27 Claims, 9 Drawing Sheets

(51) Int. Cl.
   *B32B 5/06*     (2006.01)
   *B32B 5/16*     (2006.01)
   *B32B 5/26*     (2006.01)
   *B32B 5/30*     (2006.01)
   *B32B 7/09*     (2019.01)
   *D04H 1/46*     (2012.01)
   *D04H 1/485*    (2012.01)
   *D04H 1/488*    (2012.01)
   *D04H 18/02*    (2012.01)
   *B32B 38/00*    (2006.01)
   *B32B 38/04*    (2006.01)
   *B32B 37/12*    (2006.01)

(52) U.S. Cl.
   CPC ............... *B32B 5/30* (2013.01); *B32B 7/09* (2019.01); *B32B 37/24* (2013.01); *B32B 38/0012* (2013.01); *B32B 38/04* (2013.01); *B32B 38/06* (2013.01); *D04H 1/46* (2013.01); *D04H 1/485* (2013.01); *D04H 18/02* (2013.01); *B32B 2037/1238* (2013.01); *B32B 2038/042* (2013.01); *B32B 2250/40* (2013.01); *B32B 2250/42* (2013.01); *B32B 2262/02* (2013.01); *B32B 2264/0214* (2013.01); *B32B 2305/30* (2013.01); *B32B 2305/70* (2013.01); *B32B 2451/00* (2013.01); *B32B 2471/00* (2013.01); *D04H 1/488* (2013.01)

(58) Field of Classification Search
   CPC .... B32B 5/16; B32B 5/22; B32B 5/24; B32B 5/26; B32B 5/262; B32B 5/265; B32B 5/266; B32B 5/275; B32B 5/277; B32B 5/279; B32B 5/30; B32B 7/09; B32B 7/12; B32B 29/02; B32B 37/02; B32B 37/1027; B32B 37/24; B32B 2037/1215; B32B 2037/1238; B32B 2037/243; B32B 38/0012; B32B 38/04; B32B 3/06; B32B 2038/042; B32B 2250/03; B32B 2250/40; B32B 2250/42; B32B 2255/02; B32B 2255/26; B32B 2262/02; B32B 2262/0253; B32B 2262/0276; B32B 2262/0284; B32B 2262/12; B32B 2262/124; B32B 2262/14; B32B 2305/30; B32B 2305/70; B32B 2307/554; B32B 2307/718; B32B 2451/00; B32B 2471/00; D04H 1/413; D04H 1/4274; D04H 1/4374; D04H 1/43825; D04H 1/43828; D04H 1/43832; D04H 1/43835; D04H 1/46; D04H 1/48; D04H 1/485; D04H 1/488; D04H 1/498; D04H 1/54; D04H 1/541; D04H 1/5412; D04H 1/5414; D04H 1/5418; D04H 1/542; D04H 1/558; D04H 1/559; D04H 1/58; D04H 1/587; D04H 1/60; D04H 18/00; D04H 18/02
   See application file for complete search history.

(56) References Cited

U.S. PATENT DOCUMENTS

| | | | |
|---|---|---|---|
| 7,514,026 | B1 | 4/2009 | Zafiroglu |
| 9,315,930 | B2 * | 4/2016 | Coates ............... D04H 1/4274 |
| 2003/0152742 | A1 * | 8/2003 | Shimizu ............... B32B 5/022 |
| | | | 156/283 |
| 2014/0134386 | A1 | 5/2014 | Brumbelow et al. |
| 2018/0014678 | A1 | 1/2018 | Zafiroglu et al. |
| 2018/0327967 | A1 | 11/2018 | Rees et al. |
| 2019/0010658 | A1 | 1/2019 | Rees et al. |

OTHER PUBLICATIONS

Saghafi, R., et al.; "Mechanical Properties of Needle-Punched Fabrics in Relation to Fiber Orientation"; Journal of Textiles and Polymers, vol. 5, No. 1; Abstract, p. 48, Left Column, First Paragraph; p. 48, Right Column, Third Paragraph; Jan. 2017; pp. 48-55.

Sengupta, S. et al.; "Effects of punch density, depth of needle penetration and mass per unit area on compressional behaviour of jute needle-punched nonwoven fabrics using central composite rotatable experimental design"; Indian Journal of Fibre & Textile Research, vol. 33, p. 412, Right Column, Table 1; Dec. 2008, pp. 411-418.

* cited by examiner

NEEDLE-PUNCHED STRUCTURES CONTAINING RECYCLED FIBERS

CROSS REFERENCES TO RELATED APPLICATIONS

The present application claims priority to U.S. Provisional Patent Application No. 62/812,380, filed Mar. 1, 2019, the entire contents of which are incorporated herein by reference.

TECHNICAL FIELD

Embodiments of the subject matter disclosed herein relate to textile sheets and floor coverings having needle-punched structures with recycled textile content.

BACKGROUND

It is advantageous for textile sheets including fabrics and floorcoverings to contain functional surface layers providing aesthetics, wear resistance, barrier properties, antimicrobial properties and other properties to the textile sheets. These functional surface layers may be combined with additional layers that provide different properties to the textile sheets, for example, layers with higher bulk and lower density, reinforcing or stabilizing layers, layers of films, scrims and glass nonwovens, layers formed with short or recycled fibers and layers of bulky felts or foams. These additional layers may lack the durability and cohesive properties of the outer functional surface layers.

Other advantages are achieved through the incorporation into the textile structure of recycled textile materials. For example, U.S. Pat. No. 7,514,026 describes an incorporation process that includes shredding textiles, blending with low-melting staple fibers, and using chute feeders to form oriented structures useful as backing materials. Cohesion and abrasion resistance of the structures depend upon the level and degree of the subsequent adhesive bonding. High levels of cohesion tend to produce stiff structures. The described process requires staple fibers extracted from recycled textiles in reasonably long and opened form, limiting the available choices of recyclable material and processing equipment.

U.S. Patent Application Publication No. 2018/0014678 describes a multi-layer needle-punched composite containing an optional layer of shredded textiles between two layers of pre-needle-punched webs each pre-formed into coherent felts, with 160 ppsc as the lowest level of accumulated penetrations used to form the pre-needle-punched webs. The disclosed process uses coarse needles and very low needling densities per surface area, under 25 ppsc, to combine the pre-needle-punched felts by passing fibers from the outer surfaces of each pre-needle-punched felt through the composite and past the opposing outer surface. These fibers are then used to bond the outer surfaces by applying heat to the outer surfaces of the composite. While delamination resistance and surface stability are achieved, the placement of material within the structure is not controlled, and the stability of cut edges is not achieved unless the felts contain a high amount of low melt adhesive or extra adhesive is applied to the surfaces and heat is applied to the structure, affecting overall stiffness. The layer of shredded textiles still includes a multitude of fibers with substantial lengths. The layer of shredded textile stays mostly between the two outer fibrous layers and requires additional edge heating or pressing to stabilize its cut edges. Even if the shredded textile layer contains a higher level of low-melting material, this layer does not contribute to the stability of the overall textile structure, because the low-melt components of the shredded textile layer are not substantially advanced into the remainder of the textile structure.

Finer grinding as compared to simple shredding is a widely applicable and less expensive process for recycling a large variety of textiles. The finely ground material can furthermore be formed into uniform layers covering a wide range of area weights using commercial scattering laydown equipment, including very low weights. However, a layer of ground material can not be contained and held securely within highly open and bulky textile structures unless the layer of ground material is immediately heated following deposition. Such immediate heating usually forms a dense and stiff film-like layer.

Multiple fibrous layers, including layers of recycled textile fibers, can also be combined in a textile sheet by conventionally needle-punching fibers to penetrate through the layers. However, unless the fibrous layers are highly-entangled, joined by a high number of needle penetrations per unit area, tightly and solidly bound with adhesives, joined by sewing or stitching, or stitch-bonded with yarns, the resulting composite textile sheet can delaminate, collapse or wear quickly. Increasing the total number of needle penetrations per unit area improves surface-stability and delamination resistance but densifies the textile sheet. Densifying the textile sheet results in an undesirable loss of thickness and cushion. Bonding the fibrous layers of the textile sheet using adhesives or low-melting fibers located within the fibrous layers prevents delamination but adds undesirable cost, weight, and stiffness and densifies the textile sheet.

Therefore, a method of incorporating ground textile materials into a bulky and open textile structure by directing the propagation of the ground textile material into the desirable strata of the structure including the outer strata with minimum compaction and loss of bulk and cushion is desired.

SUMMARY

Exemplary embodiments are directed to the formation of a composite textile sheet, e.g., a needle-punched sheet that incorporates and disperses a layer of ground textile products reduced to a very short fiber form, pulp form, particle form or powder form, into two bulky lightly pre-needled tacked webs or needle-punched webs placed above and below the ground layer. In one embodiment, the pre-needled tacked webs are needle-punched with 40-80 ppsc. Non-fibrous material such as a polymeric film or membrane may also be included in the ground textile.

The assembled layers are then needle-punched with deep needle penetration strokes. In one embodiment, the needle strokes are above 10 mm. Preferably, the needle strokes are above 15 mm. Each needle deploys 4-8 barbs through the entire composite with every stroke, accumulating 80-160 penetrations per square centimeter (ppsc). The total number of penetrations can be accumulated by needling from only one side of the textile composite or can represent the sum of the penetrations from each side of the two sides of the textile composite. The needles pass completely through and proceed beyond the ground material and both pre-needled tacked webs while preserving most of the initial bulk and cushion.

In one embodiment, the two surrounding pre-needled tacked webs are free of low-melt content. In one embodiment, the two pre-needled tacked webs include low melt fibers, representing 5-20% lower melting polymeric content. In one embodiment, the low-melt content is provided by low-melt fibers blended with higher-melting fibers. In another embodiment, bi-component low-melt/high-melt fibers with cross sections of side-by-side low-melt/high-melt polymer, or high-melting cores and low melting sheaths provide the 5-20% low melt content.

In one embodiment, the textile sheet structure includes two pre-needled tacked webs sandwiching a layer of ground textile fibers dispersed deeply into the two joined pre-needled tacked webs and intertwined with both of the webs fibers using the stabilization process in accordance with exemplary embodiments without significant loss of bulk in the fibrous layers.

In one embodiment, two lightly tacked pre-needled tacked webs and a layer of ground textile fibers are layered in direct contact with each other. Alternatively, additional layers are included between the pre-needled tacked webs and layers of ground textile fibers, e.g., additional layers are placed on the exterior faces of the first pre-needled tacked web, the second pre-needled tacked web, or both the first and second pre-needled tacked webs. In one embodiment, ground fibers or particles are added by scattering the ground recycled fibers over one pre-needled tacked web before placing the second pre-needled tacked web over the scattered layer. The ground recycled fibers are then encapsulated within the adjacent fibrous layers. In one embodiment, active ground elements are added to the layer of ground textile or recycled fibers, for example, by additional scattering or by pre-blending, before incorporating the layer of ground textile or recycled fibers into the composite needle-punched textile structure. Suitable active ground elements include, but are not limited to, antimicrobial and antifungal elements, repellents, deodorants, colorants, air fresheners, and microwave-sensitive materials. In addition to a composite needle-punched structure containing two pre-needled tacked webs and an intermediate layer of ground textile fibers, embodiments of the composite needle-punched structure include more than two pre-needled tacked webs and a plurality of intermediate layers of ground textile fibers. Each layer of ground textile fibers is located between a given pair of pre-needled tacked webs.

In one embodiment, additional outer layers including, but not limited to, films, woven fabrics, knit fabrics, nonwoven fabrics, felts, papers, nets and combinations thereof are attached to the composite needle-punched structure. These additional outer layers can be attached using the needle-punching process, an adhesive bonding process or combinations of needle-punching and adhesive bonding processes.

Exemplary embodiments are directed to a method for forming a composite needle-punched structure. A first needle-punched web is formed by needling a first layer of fibers, and a second needle-punched web is formed by needling a second layer of fibers. In one embodiment, the first layer of fibers and the second layer of fibers each contain at least 5% low melting content and have a weight of from about 5 oz/yd$^2$ to about 25 oz/yd$^2$. In one embodiment, the first layer of fibers is needled with a first needle punching density of 40 to 80 penetrations/cm$^2$, and the second layer of fibers is needled with a second needle punching density of 40 to 80 penetrations/cm$^2$. In one embodiment, the first needle-punched web and the second needle-punched web each have a low-melt content greater than 1%. In one embodiment, the first needle-punched web and the second needle-punched web each have a low-melt content of from about 5% to about 40%. In one embodiment, the first needle-punched web has a first thickness, and the second needle-punched web has a second thickness. The first thickness and the second thickness each range from about 0.04 inches and about 0.40 inches. In one embodiment, the first needle-punched web and the second needle-punched web each contain from about 5% to about 25% 50/50 bicomponent high/low melting fibers.

A layer of ground material containing a low-melt content greater than 1% is deposited onto the first needle-punched web. In one embodiment, a plurality of superposed layers of ground material is deposited on the first needle-punched web. In one embodiment, the layer of ground material is a layer of ground textile fibers. In one embodiment, the layer of ground material includes fibers having fiber lengths up to about 0.125 inches. In one embodiment, the layer of ground material has a low-melt content of greater than about 5%. In one embodiment, the layer of ground material has a low-melt content of from about 1% to about 40%. In one embodiment, the layer of ground material has a total weight of greater than about 2 oz/yd$^2$. In one embodiment, the layer of ground material has a total weight of from about 2 oz/yd$^2$ to about 20 oz/yd$^2$. In one embodiment, additional ground material is mixed into the layer of ground material before depositing the layer of ground material onto the first needle-punched felt. Suitable additional ground material includes, but is not limited to, plastic bottle waste, low-melting freeze ground films, commercial low-melting adhesive powders or particles, active particulate material, nonactive particulate material and combinations thereof.

The second needle-punched web is placed on the layer of ground material such that the layer of ground material is disposed between the first needle-punched web and the second needle-punched web. In one embodiment, the first needle-punched web has a first needle exit side from which fibers from the first layer of fibers extend, and the second needle-punched web has a second needle exit side from which fibers from the second layer of fibers extend. The layer of ground material is deposited on the first needle exit side, and the second needle-punched exit side is placed on the layer of ground material.

Additional needling is performed through the first needle-punched web, the second needle-punched web, and the layer of ground material from a first needle-punched web outer surface or a second needle-punched web outer surface or both the first needle-punched web outer surface and the second needle-punched web outer surface. The additional needling is sufficient to disperse at least a portion of the ground material into the first needle-punched web and the second needle-punched web towards the first needle-punched web outer surface and the second needle-punched web outer surface. In one embodiment, the additional needing is performed with long needle strokes in the range of 10 to 15 mm, resulting in an average number of needle barb passages though the composite needle-punched structure in the range of 4 to 8 barbs per needle stroke. In addition, the additional needling is performed at a density of 80 to 160 penetrations/cm$^2$. In one embodiment, a sufficient amount of additional needling is performed to disperse a majority of the fibers, pulp and particles in the ground material into the first needle-punched web and the second needle-punched web. In one embodiment, at least one of air, vibration and suction are applied the first needle-punched web, the second needle-punched web and the layer of ground material to move fibers, pulp or particles in the ground material into the first needle-punched web and the second needle-punched web.

Heat is applied to activate the low-melt content and to secure the composite needle-punched structure. In one embodiment, pressure is applied in combination with applying heat or pressure is applied after applying heat. In one embodiment, both heat and pressure are applied from the first needle-punched web outer surface or the second needle-punched web outer surface or both the first needle-punched web outer surface and the second needle-punched web outer surface. Applying heat includes applying heat in an oven, applying heat in a fabric finishing range, applying heat in a blanket laminator and applying heat in a dual belt laminator.

In one embodiment, an additional layer is applied on the composite needle-punched structure. Suitable additional layers include, but are not limited to, a functional layer and a decorative fabric layer. In one embodiment, the composite needle-punched structure is embossed with a three-dimensional pattern using pressure and heat.

In one embodiment, at least one additional needle-punched web by needling an additional layer of fibers, and an addition layer of ground material is deposited on each additional needle-punched web. Each additional needle-punched web and additional layer of ground material is incorporated into the composite needle-punched structure, and additional needling is performed through the first needle-punched web, the second needle-punched web, the layer of ground material, and each additional needle-punched web and each additional layer of ground material.

In one embodiment, an open textile layer is placed between the first needle-punched web and the layer of ground material or between the second needle-punched web and the layer of ground material. In one embodiment, the composite needle-punched structure has an overall recycle content of from 5% to 40%.

Exemplary embodiments are also directed to a composite needle-punched structure have a first needle-punched web containing a first layer of fibers, a second needle-punched web containing a second layer of fibers and a layer of ground material disposed between the first needle-punched web and the second needle-punched web. The layer of ground material has a low-melt content greater than 1%. At least a portion of the ground material is dispersed into the first layer of fibers in the first needle-punched web and the second layer of fibers in the second needle-punched web towards a first needle-punched web outer surface and a second needle-punched web outer surface.

In one embodiment, the first layer of fibers and the second layer of fibers each contain at least 5% low melting content and have a weight of from about 5 oz/yd$^2$ to about 25 oz/yd$^2$. In one embodiment, the first layer of fibers contains a first needle punching density of 40 to 80 penetrations/cm$^2$, and the second layer of fibers has a second needle punching density of 40 to 80 penetrations/cm$^2$. In one embodiment, the composite needle-punched structure has an overall needle punching density of 80 to 160 penetrations/cm$^2$. In one embodiment, the layer of ground material contains fibers having fiber lengths up to about 0.125 inches. In one embodiment, the layer of ground material has a total weight of from about 2 oz/yd$^2$ to about 20 oz/yd$^2$.

In one embodiment, the composite needle-punched structure also includes at least one additional needle-punched web formed from an additional layer of fibers and an addition layer of ground material for each additional needle-punched web. Each additional needle-punched web and additional layer of ground material is incorporated into the composite needle-punched structure such that each additional layer of ground material is disposed between two needle-punched webs. A portion of the ground material of each additional layer of ground material is dispersed into the layer of fibers in the two needle-punched webs. In one embodiment, the composite needle-punched structure has an overall recycle content of from 5% to 40%.

BRIEF DESCRIPTION OF THE DRAWINGS

The accompanying drawings, which are incorporated in and constitute a part of the specification, illustrate a plurality of embodiments and, together with the following descriptions, explain these embodiments.

DETAILED DESCRIPTION

Figure 1:
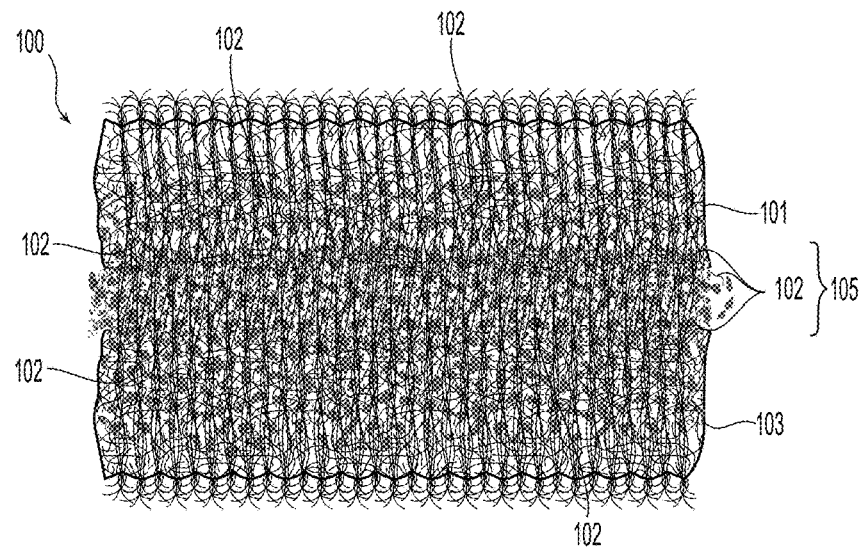
FIG. 1 is a schematic representation of an embodiment of a composite needle-punched structure showing recycled ground textile elements distributed within a needle punched structure.

The following description of the embodiments refers to the accompanying figures. The same reference numbers in different figures identify the same or similar elements. Reference throughout the whole specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, particular features, structures or characteristics may be combined in any suitable manner in one or more embodiments.

Exemplary embodiments are directed to needle-punched structures or needle-punched felts, composite needle-punched structures and methods for making the composite needle-punched structures. A layer of ground material such as ground textile fibers is encapsulated between two lightly needle-punched or pre-needled tacked web layers. In one embodiment, the layer of ground material includes low-melt content and recycled fibers. As used herein, low-melt content includes thermoplastic materials having a melting point lower than about 150° C., as compared to high-melt textile and polymeric fibers and natural fibers that do not melt or have a melting point higher than about 200° C. In one embodiment, the low-melt content softens and becomes bondable with heat and pressure at temperatures above 125° C. Suitable low-melt materials include, but are not limited to low-melting polyesters, and polyolefin fibers including polyethylene and polypropylene. In one embodiment, the low-melt content includes thermoplastic fibers, e.g., polyolefins and other low-melt thermoplastic components. In one embodiment, the layer of ground material has a low-melt content greater than about 1%. In one embodiment, the layer of ground material has a low-melt content of greater than about 5%. In one embodiment, the layer of ground material has a low-melt content of from about 1% to about 40%.

In one embodiment, the ground material is obtained from grinding recycled textiles into short fibers, pulp or particulates. In one embodiment, the recycled textiles include low-melt components. Any grinding equipment known and available in the art that is capable of producing the desired ground content from recycled textiles can be used. Suitable grinding machinery is available from Vecoplan LLC of High Point, N.C., eFactorThree of Pineville, N.C., SSI Shredding Systems, Inc. of Wilsonville, Oreg., ITS Shredding and Grinding Solutions of Cesano Boscone (MI), Italy, Granutech-Saturn Systems of Grand Prairie, Tex., Herbold Meckesheim GmbH of Meckesheim, Germany, Pallman Industries, Inc. of Clifton, N.J., Schutte-Buffalo Hammermill of Buffalo, N.Y., Republic Machine of Louisville, Ky., UNTHA Shredding Technology America, Inc. of Hampton, N.H., WEIMA America Inc. of Fort Mill, S.C. and Jordan Reduction Solutions of Birmingham, Ala.

In one embodiment, the ground material is placed between the two needle-punched textile layers or tacked webs, i.e., textile layers that are each pre-needled before the placement of the ground textile fibers, by first depositing the ground material onto a first lightly pre-needled tacked web formed by needling a first layer of fibers. In one embodiment, the area density of needling of the pre-needled tacked webs is in the range of 40-80 penetrations per square centimeter (ppsc). Preferably, the ground material is deposited onto the needle-exit side of the first pre-needled tacked web. In one embodiment, a scattering process is used to deposit the ground material. Suitable equipment for scattering ground particles and short textile fibers over a surface is known and available in the art. Suitable scattering machinery is available from IPCO AB of Sandviken, Sweden, Maschinenfabrik Herbert Meyer GmbH of Rotz, Germany, Coatema Coating Machinery GmbH of Dormagen, Germany, Santex Rimar Group of Vicenza, Italy, Jacob Weiss and Schott & Meissner Maschinen-und Anlagenbau GmbH of Blaufelden, Germany. In one embodiment, the equipment used for scattering is modified to improve the scattering of ground particles and textile fibers. These modifications include, but are not limited to, incorporating vibratory sides, using an agitator to prevent clumping and to maintain consistent side to center to side bulk density, using side-to-side traversing, incorporating static bars to reduce static charge in the scattered fibers, and grounding on metal machinery elements.

A second layer of lightly needle-punched tacked web is formed by lightly needle-punching a second layer of fibers. The resulting second needle-punched or pre-needled tacked web is placed on top of the deposited layer of ground material such that the layer of ground material is disposed between the first needle-punched tacked web and the second needle-punched tacked web.

In one embodiment, at least a portion of the ground textile fibers, e.g., recycled pulp, fibers, particles or powder, are driven into and dispersed in the surrounding first and second pre-needled tacked webs using fine needles and deep strokes. In one embodiment, the strokes exceed 10 mm. Preferably, the strokes exceed 15 mm. In one embodiment, each stroke deploys 4 to 8 barbs per needle. This needling action accumulates 80-160 added penetrations per square cm through the entire composite. Depending upon the desired application of the composite structure and the needs of the composite structure, this needling can be performed from one side or both sides, with the number of total penetrations adding up to 80-160 per square cm. In one embodiment, most of the ground textile fibers, including the resulting fine particles or powders, are blended by the needle-action, embedding the short fiber or powder and redistributing them among the fibers of the first and second needle-punched or pre-needled tacked webs. Fiber and powder are driven bi-directionally as the longer needle strokes drive the ground material in both the upward and downward directions, with the barbs pushing the short fibers and larger ground particles in one direction, and friction dragging up the smaller particles to a lesser degree on the return in the opposite direction. The combination of longer strokes with increased barb engagement and moderate number of penetrations per unit area allows the distribution of the recycled material widely and intimately among the lightly pre-entangled fibers of the surrounding pre-needled tacked webs without excessively reducing the bulk of the needle-punched layers. The resulting composite needle-punched structure is transferred to heating, calendering, embossing or laminating equipment for further treatment without shedding and losing recycled content.

In one embodiment, suitable fiber lengths in the ground textile fibers are smaller than about ⅛", preferably smaller than ¹⁄₃₂". Longer fiber lengths increase the chance of clumping, and shorter fiber lengths flow more evenly, providing a more uniform distribution across the scattered width and easier insertion deeply into the surrounding layers.

Limiting a level of pre-needling to 40-80 penetrations per/cm² is sufficient to allow the first and second pre-needled tacked webs to be sufficiently compacted to strip the short ground textile fibers from the relatively fine barbs of the relatively fine needles used during the subsequent additional needling stage, to hold the ground fibers, and to avoid the ground textile fibers from exiting the resulting composite needle-punched structure. This level of needle punching density also allows the propulsion or transfer of the ground textile fibers into the first and second needle-punched tacked web layers without significantly densifying the resulting composite needle-punched structure. The recycled pulp or particles are predominantly driven to within a short depth from the final upper and lower surfaces of the composite needle-punched structure, minimizing negative effects on stiffness or cushion.

In one embodiment, additional fibrous or non-fibrous particles or powders in low-melt or high-melt solid form are included within the first pre-needled tacked web, the second pre-needled tacked web, or both the first and second pre-needled tacked webs. In one embodiment, the first and second pre-needled tacked webs use 5 to 25% by weight low melt fibers. In one embodiment, the first and second pre-needled tacked webs weigh between 5 and 25 oz/yd$^2$.

The resulting composite fibrous textile needle-punched structure maintains a significant level of bulk and cushion and attains high cut-edge stability and high delamination resistance. The overall needling density and the level of low-melt fibers within the pre-needled outer layers is reduced compared to the needle punch densities and low-melt fiber contents required to achieve these improved properties in the absence of recycled fibers, pulps or particles containing low melt elements. In addition, the fibrous textile needle-punched structure can encapsulate selected additional and optional reinforcing, cushioning, stabilizing or active components in similarly ground form without requiring the pre-bonding of the two layers to each other.

Exemplary embodiments allow the introduction of ground recycled textile material into a cushioning felt structure at significant levels, e.g., from about 1% to about 40%. In addition, the low-melt content required to stabilize the first and second pre-needled tacked webs is reduced or eliminated, lowering overall cost.

Referring initially to FIG. 1, exemplary embodiments are directed to a composite needle-punched textile sheet structure 100 formed by combining a plurality of layers. As illustrated, the plurality of layers includes three layers, a first fibrous needle-punched layer or pre-needled tacked web 101, a layer of ground material 105 that includes ground recycled fibers 110 and a second needle-punched fibrous layer or pre-needled tacked web 103. Preferably, the layer of ground material includes only short fibers, particles and powders. The three layers are combined in a manner that disperses at least a portion of the ground textile fibers 102 at least partially into the two surrounding fibrous needle-punched layers 101 and 103. The layer of ground material moves into the surrounding first and second fibrous needle-punched layers. The composite needle-punched textile sheet structure 100 can be formed in separate steps or can be formed using a continuous and synchronized process involving multiple stages. The dimensional stability of the bulky pre-needled tacked webs is limited. Therefore, a continuous process is preferably used where the ground material is directly deposited upon the first pre-needled tacked web exiting a needling loom, and the second pre-needled web existing a needling loom is also directly deposited onto the ground layer as the resulting composite containing the deposited ground layer continues and passes under or through a first additional needling loom. As illustrated in FIG. 1, additional needling is performed from one side only, requiring only one additional needling loom. If the additional needling is performed from both sides, the composite needle-punched structures proceeds into a second additional needling loom after the first additional needling loom.

Figure 2:
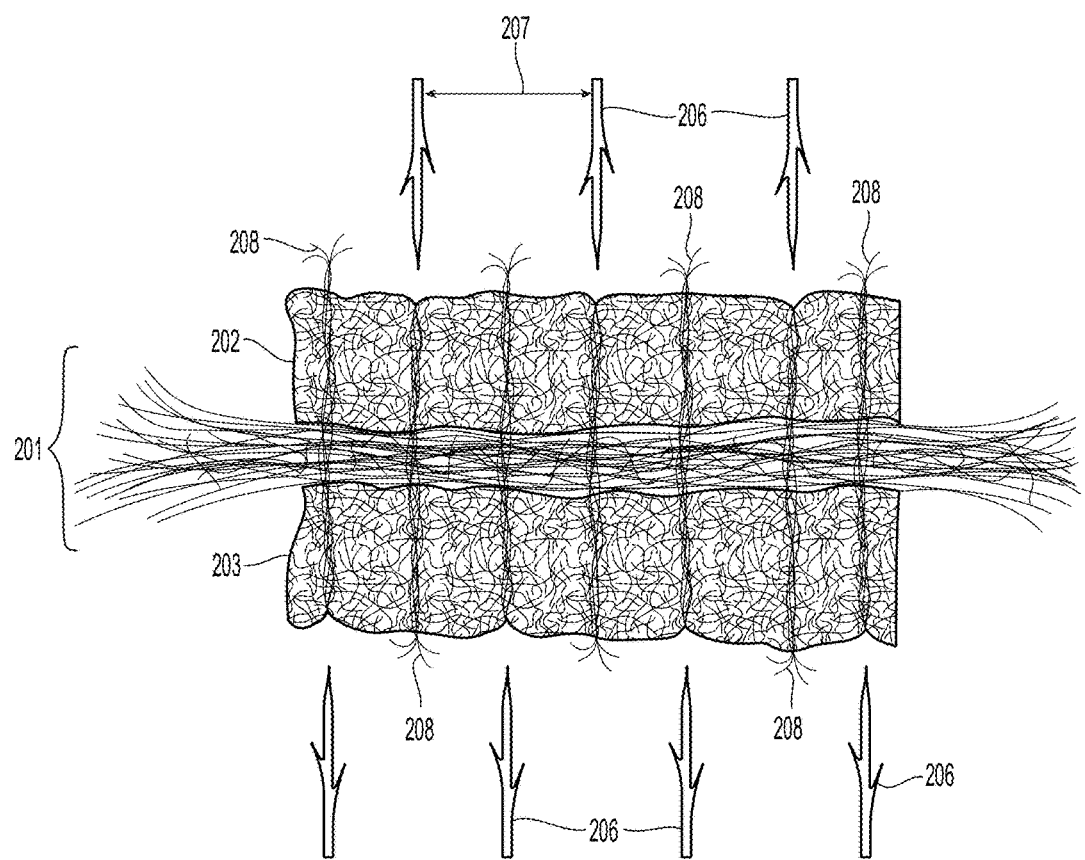
FIG. 2 is a schematic representation of a prior art textile sheet containing a layer of shredded textile fibers having a large variety of lengths encapsulated within a needle-punched structure, and largely concentrated in the center section between two outer pre-needled felts.

Referring to FIG. 2, and contrasting with the structure of FIG. 1, a prior art composite wherein shredded recycled fibers are centrally held between two highly-needled fibrous felts is illustrated. The recycled fibers remain essentially in their initial central position. A layer of fibers 201 derived by shredding a textile without grinding is introduced between a first pre-needle-punched fibrous felt 202 and a second pre-needle-punched fibrous felt 203. Shredders use spiked rolls, for example, carding rolls, that tear apart the fabric without reducing fiber size to a level that can be uniformly scattered into a layer without clumping or blocking. The shredded layer of fibers contains longer fibers. Examples of such a layer of fibers introduced between two pre-needle-punched fibrous felts are discussed in U.S. Patent Application Publication No. 2018/0014678, which is incorporated herein by reference in its entirety. The shredded recycled fibers remain mostly as an integral layer between the two pre-needle-punched layers after highly-limited additional needle-punching from above, from below or from above and below using large coarse needles 206 spaced at large distances 207 from each other. The needles drive the surface fibers through all three layers in a manner simulating stitching. Tufts of fibers 208 extend past the outer faces. The needling density is maintained under 25 penetrations/cm$^2$, which is less than ¼ of the density required in the final composite-needling stage by the present invention. The recycled fibers remain within the layer of fibers 201, with the exception of occasional fibers locally driven by the coarse needles.

Figure 3:
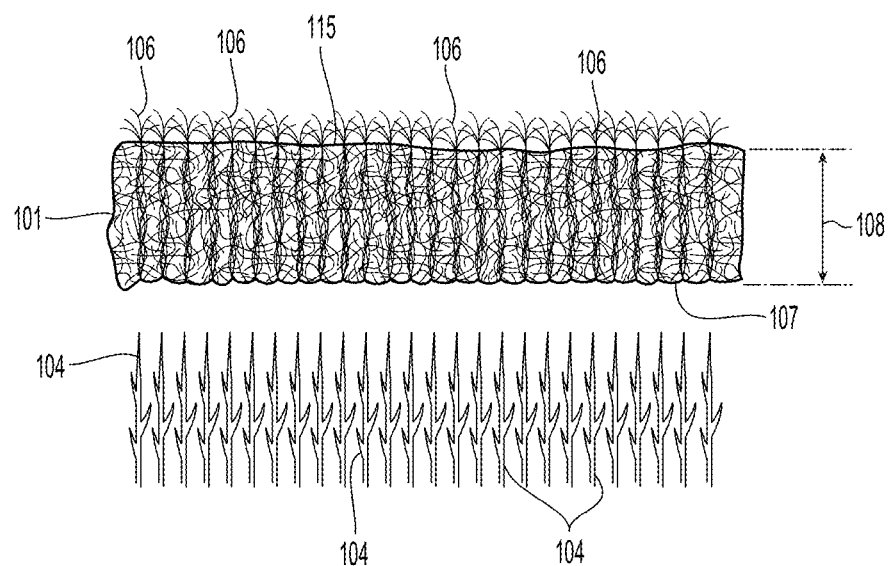
FIG. 3 a schematic representation of an embodiment of a first needle-punched tacked web of fibers prepared to receive a layer of ground textile fibers.

Referring to FIG. 3, in one embodiment, a first needle-punched tacked web 101 is formed by lightly needling or tacking a first layer of fibers. As illustrated, the first layer of fibers is needled from a single needle entrance side 107. In one embodiment, the first layer of fibers includes low-melting binder fibers. In one embodiment, the first layer of fibers includes a low-melt content of greater than 1%. In one embodiment, the first layer of fibers includes a low-melt content of from about 5% to about 40%. In one embodiment, about 5% to about 25% of the fibers are 50/50 bicomponent high/low melting fibers. The first layer of fibers is needled with a plurality of finer needles 104. In one embodiment, the first layer is needled with a needle punching density greater than 40 penetrations/cm$^2$, preferably from about 40 to 80 penetrations/cm$^2$. The first layer or web of fibers includes longer fibers having a length substantially greater than the thickness of the first layer of fibers. In one embodiment, the first layer of fibers also includes shorter fibers or continuous filaments. The resulting first needle-punched or pre-needled tacked web has a relatively smooth needle entrance side 107 and a rougher needle exit side 115 opposite the needle entrance side from which fibers from the first layer of fibers extend. Therefore, a plurality of needled fiber ends 106 protrude from the needle exit side 115. In one embodiment, the resulting first needle-punched tacked web has a needle-punched thickness 108 of approximately 1 mm to 10 mm (0.04 inches to 0.4 inches), and a weight of from about 5 oz/yd$^2$ to about 25 oz/yd$^2$.

Figure 4:
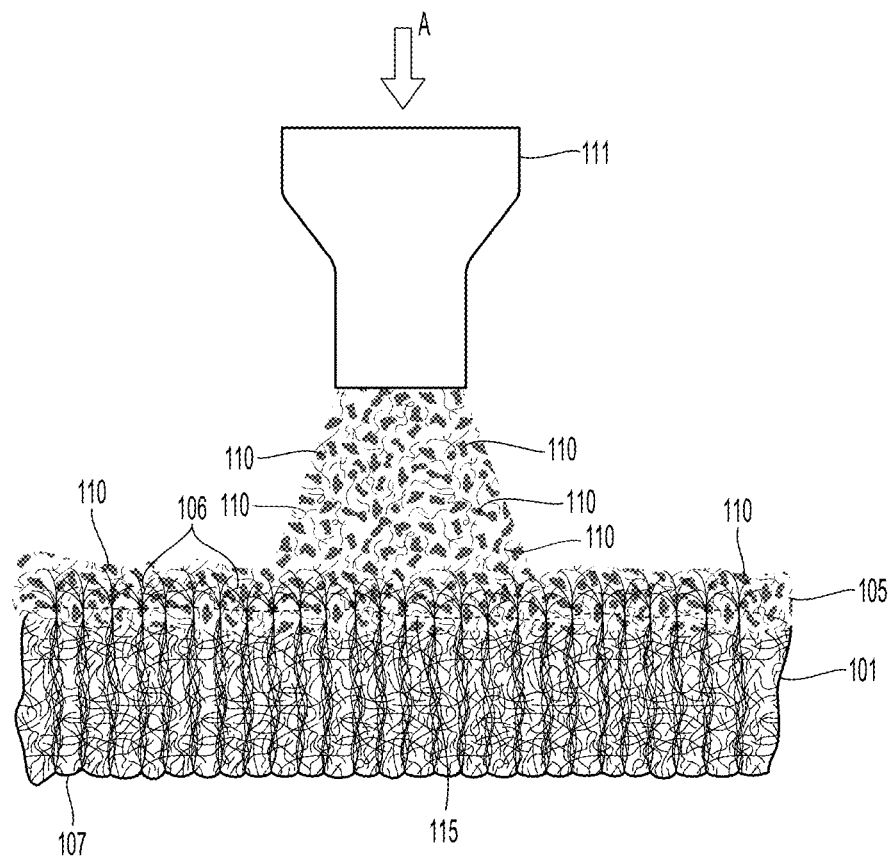
FIG. 4 is a schematic representation of an embodiment of the first needle-punched structure of FIG. 3 with a layer of ground textile fibers deposited thereon.

Referring now to FIG. 4, the layer of ground material 105 is deposited onto the first pre-needled tacked web 101. The layer of ground material is derived from textile waste or an existing sheet of textile product that is to be recycled. In one embodiment, the textile waste or sheet of textile product is ground into ground material by introducing the textile waste or sheet of textile product into using grinding and scattering equipment 111 as indicated by arrow A. In one embodiment, the layer of ground material is a layer of ground textile fibers. In one embodiment, the ground material is a mixture of very short fibers, pulp and particles 110. Suitable grinding equipment and scattering systems are discussed herein.

The mixture of short fibers, pulp and particles is deposited or scattered onto the first needle-punched felt to form the layer of ground material 105. Preferably, the mixture of short fibers, pulp and particles is deposited onto the first needle exit side 115 of the first needle-punched felt 101. Placing the mixture of short fibers, pulp and particles on the needle exit side facilitates penetration of the ground material among the needled fiber protrusions 106 of the first needle-punched sheet 101. In one embodiment, the layer of ground material has a total weight of greater than about 2 oz/yd$^2$. In one embodiment, the layer of ground material has a total weight of from about 2 oz/yd$^2$ to about 20 oz/yd$^2$. In one embodiment, the layer of ground material contains recycled content. In one embodiment, the ground material includes from about 7% to about 33% recycled content.

In one embodiment, the ground material, e.g., the ground textile fibers, contain low melt components. In one embodiment, low melt components are present from about 1% to about 40% of the weight of the ground material. Preferably, low melt components are present at levels above 5% of the weight of the ground material. In one embodiment, a single layer of ground material is deposited onto the first needle-punched felt. In one embodiment, a plurality of overlapping or superimposed layers of ground material are deposited onto the first needle-punched felt. In one embodiment, the layer of ground material is applied evenly over the first needle-punched felt. Alternatively, the thickness of the layer of ground material is varied across the first needled-punched web.

In one embodiment, additional ground material is blended into the layer of ground material. In one embodiment, the additional ground material is blended into the layer of ground material before the layer of ground material is deposited onto the first pre-needled tacked web. Suitable additional ground material includes plastic bottle waste, low-melting freeze ground films, commercial low-melting adhesive powders or particles, active particulate material, nonactive particulate material and combinations thereof. In one embodiment, additional low-melting ground materials, for example, fibers formed with bottle waste, low-melting freeze-ground films and commercial low-melting powders or particles, are co-ground or added to and blended with the ground material, e.g., the ground textile fibers, to adjust the weight percentage of low-melt content in the ground material. In addition, incorporation of the additional low-melting ground materials provides a convenient channel for recycling the additional low-melting ground materials. In one embodiment, the weight of all ground materials deposited onto the first pre-needled tacked web 101 is between approximately 2.0 oz/yd$^2$ and 20 oz/yd$^2$. In addition, the low-melt content of all ground materials ranges from about 5% to about 40%. In one embodiment, the size of the ground textile fibers in the ground materials ranges from fine powder to about ⅛". Longer fibers in the ground textile fibers are avoided, because the longer fibers increase the chance of clumping. Shorter fibers flow more evenly and are distributed more uniformly across the scattered width. Ground textile fibers are also susceptible to clumping by nucleating with static charge generated by triboelectricity in the grinding or scattering processes. In one embodiment, an electronic static eliminator is used in the grinding equipment and scattering system to reduce static charge and clumping. Suitable static eliminators are known and available in the art, for example, from Exair Corporation of Cincinnati, Ohio, Meech International of Oxfordshire, UK, Haug of Williamsville, N.Y., Tantec A/S of Lunderskov, Denmark, and Simco-Ion, Industrial Group of Hatfield, Pa.

Figure 5:
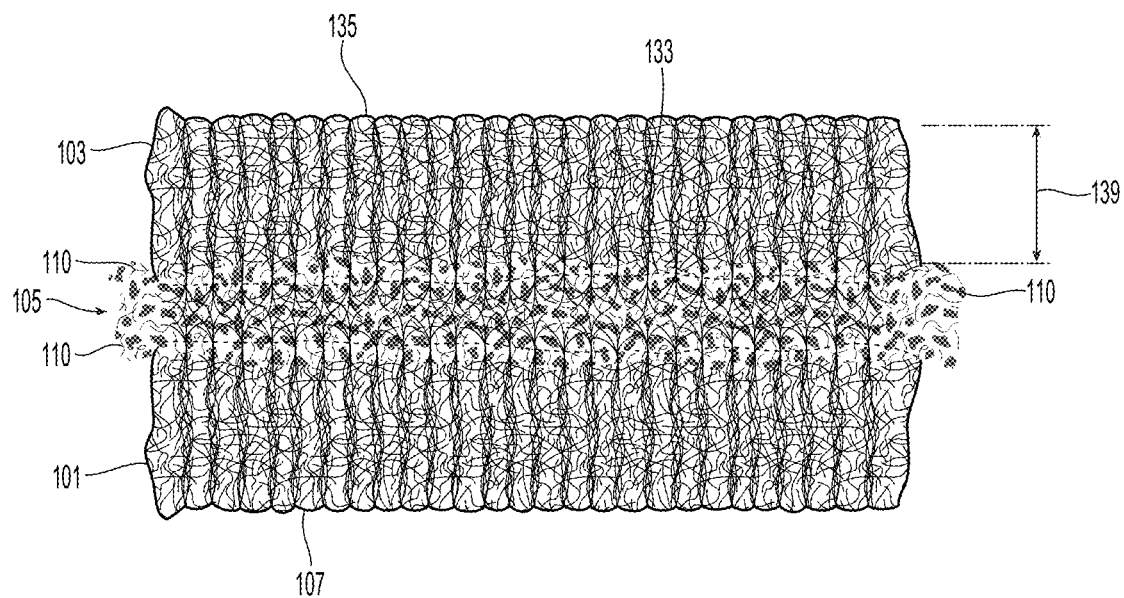
FIG. 5 a schematic representation of a second pre-needled tacked web of textile fibers placed over the assembly of FIG. 4.

Referring now to FIG. 5, a second needle-punched or pre-needled tacked web 103 is formed by needling a second layer of fibers using the types of fibers and needling processing similar to or the same as those used to form the first needle-punched felt 101.

The second pre-needled tacked web has a needle entrance side 135 and a second needle exit side 133 from which fibers extend. The second pre-needled tacked web has a thickness 139. In one embodiment, the thickness is from about 0.04 inches to about 0.4 inches. In one embodiment, the resulting combination of fibers in the second pre-needled tacked web is identical to the fibers in the first pre-needled tacked web. Alternatively, the resulting combination of fibers in the second pre-needled tacked web is different than the fibers in the first pre-needled tacked web. In one embodiment, the second pre-needled tacked web 103 is prepared in an identical manner and with the same weight and needling conditions as the first pre-needled tacked web 101. In one embodiment, the second layer of fibers has a low-melt content of greater than 1%. In one embodiment, the second layer of fibers has a low-melt content of from about 5% to about 40%. In one embodiment, about 5% to about 25% of the fibers are 50/50 bicomponent high/low melting fibers. Alternatively, one or more of the weight, composition and needling conditions of the second pre-needled tacked web are varied.

Once formed, the second pre-needled tacked web 103 is laid over the first pre-needled tacked web 101 and the layer of ground material 105 containing the mixture of very short fibers, pulp and particles 110. This positions the ground material, i.e., the ground fibers and recycled material, between the two pre-needled tacked webs. Preferably, the second pre-needled tacked web is positioned with the second needle exit side 133 against the layer of ground material. In one embodiment, vibration, blown air, suction and combinations of vibration, blown air and suction are applied to the outer smooth surfaces of the needle entrance side 107 of the first pre-needled tacked web, the needle entrance side 135 of the second pre-needled tacked web or both the needle entrance side 107 of the first pre-needled tacked web and the needle entrance side 135 of the second pre-needled tacked web. Vibration, blown air and suction can be applied before, after or during placement of the second pre-needled tacked web over the layer of ground material to move the fibers, pulp and particles 110 of the ground material partially into the first pre-needled tacked web and the second pre-needled tacked web.

Figure 6:
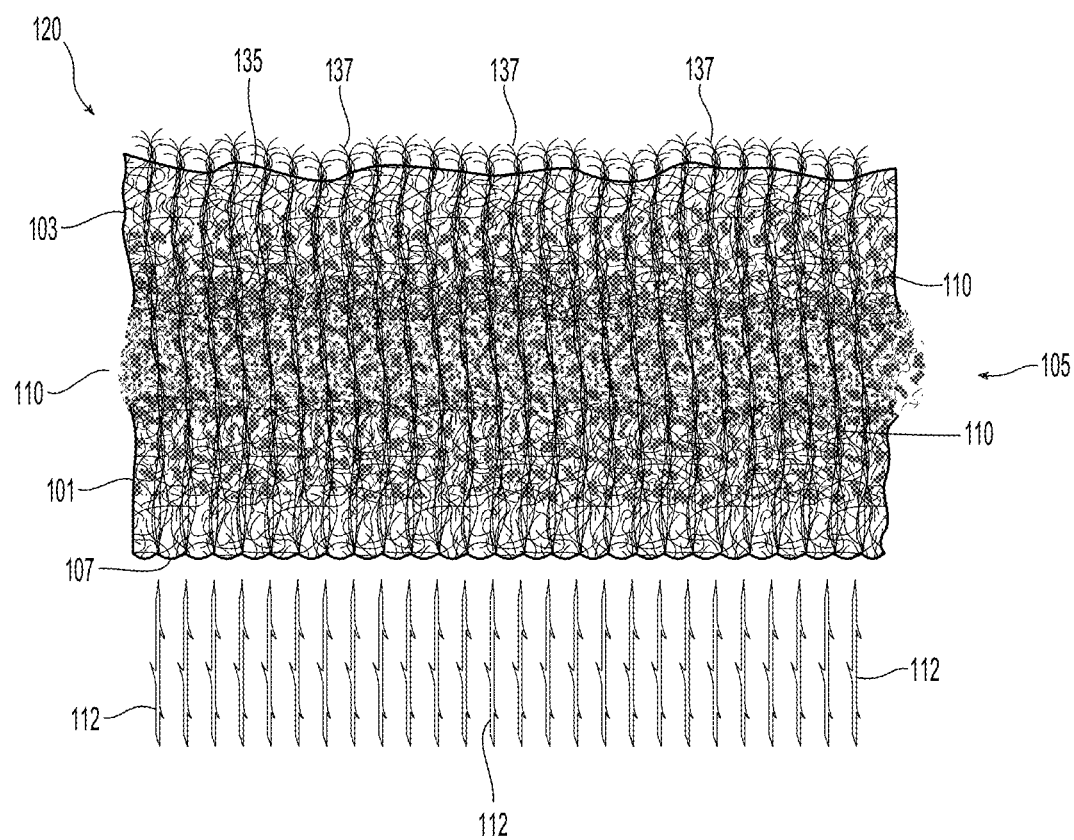
FIG. 6 is a schematic representation of the assembly of FIG. 5 after being subjected to additional deep-stroke needle-punching to secure all layers and distribute the ground recycled elements within the structure.

Referring to FIG. 6, having located the ground material between the first and second pre-needled tacked webs, additional needling is performed on and through the resulting composite of the first pre-needled tacked web 101, the second pre-needled tacked web 103 and the layer of ground textile fibers 105. In one embodiment, a plurality of needles 112 are used to provide the additional needling. The additional needling may be performed from the needle entrance side 107 of the first pre-needled tacked web, as shown, or from the opposite side 135, or from both sides. As illustrated in FIG. 6, additional needling is performed from only one side of the composite needle-punched structure. This produces fibers or fiber tufts 137 extending from the opposite side 135. In one embodiment, the total numbers of penetrations from one or both sides is in the range of 80 to 160. The additional needling is sufficient to disperse at least a portion of the ground material into the first pre-needled tacked web and the second pre-needled tacked web toward the first pre-needled tacked web outer surface and the second pre-needled tacked web outer surface.

Figure 11:
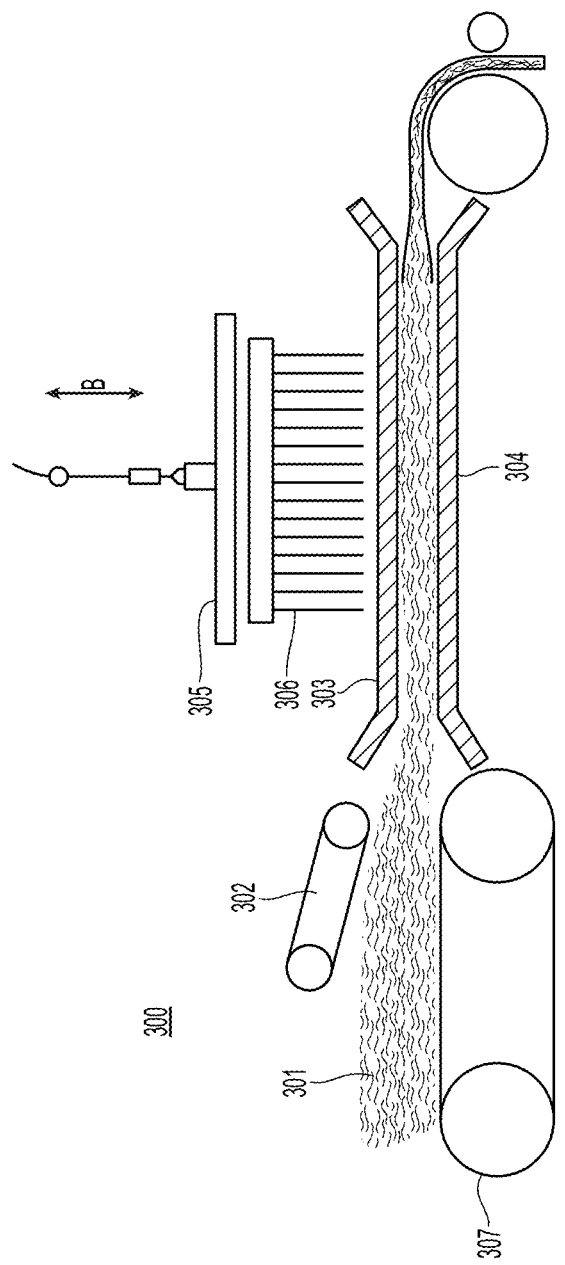
FIG. 11 is a schematic representation of an embodiment of a needle-punching apparatus for use in needling fiber layers or a composite structure.

The types of needles used, the needle arrangement on the needle plates, the needle strokes in each step, and the total number of needle penetrations in each step are adjusted relative to each other to engage the layers and to disperse the fibers, pulp and particles 110 of the ground material into the first pre-needled tacked web and the second pre-needled tacked web. Referring to FIG. 11, an exemplary embodiment of a needle-punch apparatus 300 for needling the tacked webs and composite structure is illustrated. The apparatus includes a main drive 307 such as a main drive belt to convey the fiber layer 301, web or composite structure through the apparatus. An input device 302 directs the fiber layer between a bed plate 304 and a stripper plate 303 or needle plate. The stripper plate includes a plurality of holes to provide passage for the plurality of barbed needles 306 mounted on a needle plate or needle board 305. The needle plate reciprocates up and down in the direction of arrow B, entering and exiting the fiber layer, web or composite structure. The needles are propelled through holding plates, i.e., the stripper plate and bed plate, with openings matching the pattern of needles on the needle plate, allowing the needles to go through. Each needle includes a plurality of barbs along its length, and the amplitude of the stroke of the needle plate up and down is adjusted so that a different number of barbs on the needles interact with the fiber layer, web or composite structure.

The stroke or depth of needle penetration in needle punching refers to the longest distance that the first barb in the needle reaches below the lower surface of the web or bed plate. The depth is set by lowering the bed plate to increase the needle penetration or raising it to decrease the depth of penetration. In one embodiment, the strokes exceed 10 mm. Preferably, the strokes exceed 15 mm. In one embodiment, a moderate number of needle penetrations per unit area, e.g., above 80 per square cm, is accommodated by using longer and deeper needle-bar strokes. Higher needle penetration depths or strokes cause a high number of needle barbs to engage the ground short fibers and particles. For example, a needle penetration depth of 8 mm, which is more appropriate for the tacking of the two pre-needled webs, utilizes only 2 barbs per needle. A needle penetration depth of 11 mm utilizes 4 barbs. Increasing the needle penetration depth to 13 mm utilizes 5 barbs, and a needle penetration depth of 15 mm utilizes 6 barbs per needle.

In one embodiment, the density of accumulated needle penetrations in the composite needling step is from about 80 to about 160 penetrations/cm$^2$. The fibers, pulp and particles can be driven into the first and second pre-needled tacked webs in equal or unequal proportions. The proportions to which the ground material is driven into the pre-needled tacked webs is varied by using an equal or unequal proportion of penetrations per unit area, by varying stroke depth or both equal or unequal proportions of penetrations per unit area and varying stroke depth from one side of the composite structure versus the other side.

Returning to FIG. 6, in the resulting needle-punched composite 120, fibers originating from both the first pre-needled tacked web 101 and the second pre-needled tacked web felt 103 are also meshed into each other and through the fibers, pulp and particles 110 within the original layer of ground material 105. The short fibers, pulp and particles are now dispersed among the fibers originating from the first pre-needled tacked web 101 and the second pre-needled tacked web 103. Therefore, the layer of ground material 105 is essentially eliminated as an integral layer. The interfaces among the three layers are also essentially eliminated as illustrated in FIG. 6.

Figure 7:
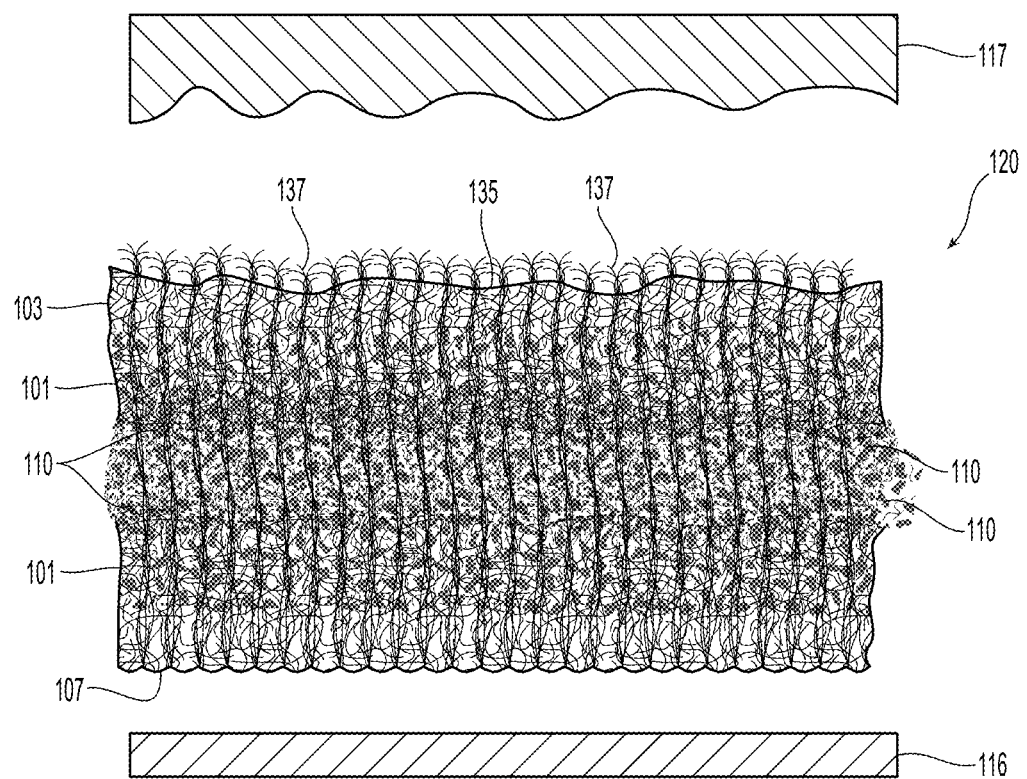
FIG. 7 a schematic representation of the assembly of FIG. 6 after being subjected to the application of heat to melt low-melting elements to produce a fully bonded composite needle-punched structure.

Referring to FIG. 7, at least one of heat and pressure, i.e., heat, pressure or heat and pressure are applied to the resulting composite needle-punched structure 120 to activate any low-melt content contained throughout the composite structure and to secure the layers of the needle-punched structure. In one embodiment, pressure is applied in combination with applying heat. Alternatively, pressure is applied after applying heat. In one embodiment, both heat and pressure are applied from the first pre-needled tacked web outer surface or the second pre-needled tacked web outer surface.

Heating is applied to the composite structure using an oven or a finishing range, by pushing hot air into the structure, or by using a dual belt laminator with surface temperatures and gaps between the belts adjusted to achieve the desired final density and stability. A hot-roll-and-blanket laminator, a calender, or any other suitable equipment known and available in the art can also be used. In one embodiment, as shown in FIG. 7, a smooth heated surface of a roll or a plate 116 is used to apply heat or pressure. Alternatively, a textured heated surface of a roll or of a plate 117 having a three-dimensional pattern is used to impart the three-dimensional pattern on the composite needle-punched structure. Therefore, the composite needle-punched structure is embossed with a three-dimensional pattern using pressure and heat. The application of heat and pressure for embossing the three-dimensional pattern can occur during a heat finishing process of the composite needle-punched structure or after a heat finishing process.

In one embodiment, additional layers are attached to the composite needle-punched structure. For example, an additional layer is placed on a needle exit side of the composite needle-punched structure resulting from the additional needling. Suitable additional layers include, but are not limited to, a functional layer and a decorative layer of textile material or nontextile material. The additional layers can be attached during additional needling to pre-tack the additional layer to the composite needle-punched structure. Alternatively, the additional layers are attached after the additional needling and before applying heat and pressure. In one embodiment, a functional or decorative fabric layer is attached to the needle-punched structure either before or after applying heat using additional adhesive placed on one of the outer surfaces of the composite needle-punched structure.

Figure 8:
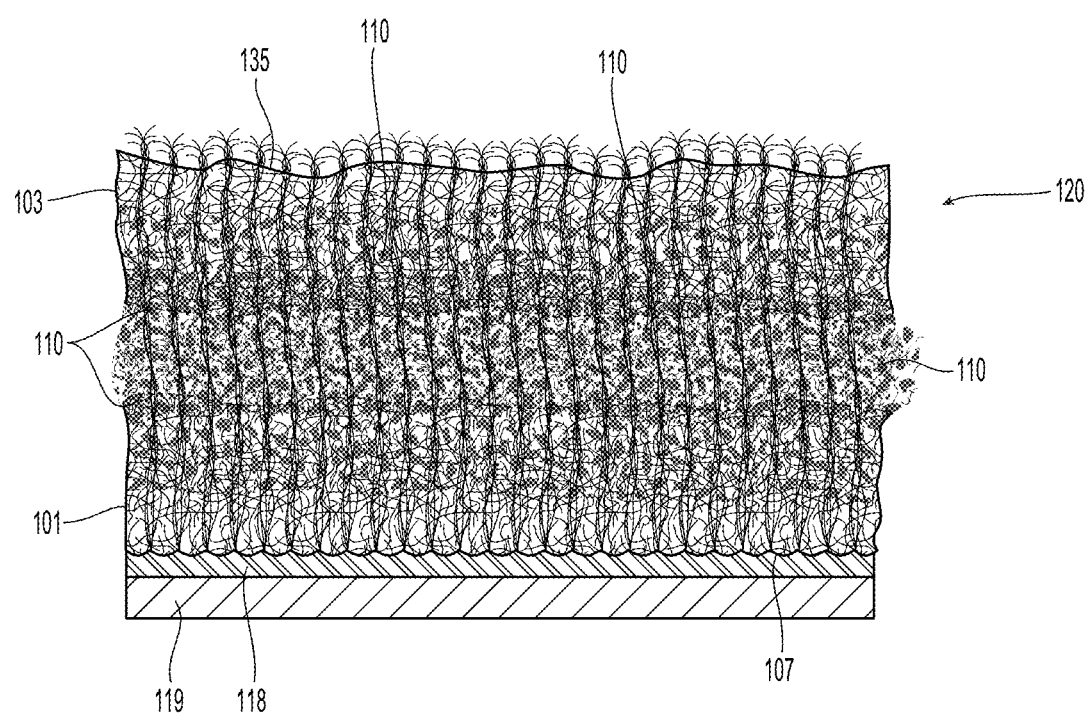
FIG. 8 is a schematic representation of the structure of FIG. 7 wherein a textile fabric and an adhesive layer have been attached to the structure.

Referring to FIG. 8, in one embodiment a low-melting adhesive layer 118 is used to attach a decorative or abrasion resistant fabric layer 119 onto one of the faces of the composite needle-punched structure 120. In one embodiment, the adhesive layer and fabric layer are attached using a flat or textured heated surface applied against the composite. In one embodiment, fabric layer 119 is a knit fabric, woven fabric, nonwoven fabric, stitch-bonded fabric or any other fibrous fabric. In one embodiment, heat and pressure are applied with a three-dimensional surface contacting the outer face of the fabric layer to produce a textile sheet structure that is highly textured.

In addition to composite needle-punched structures containing two pre-needled tacked web layers and a layer of ground material in-between, exemplary embodiments can include a plurality of layers. At least one additional layer of ground material can be contained between each adjacent pair of pre-needled tacked webs. An additional layer of ground material is deposited on each additional pre-needled tacked web and an additional layer of ground material is incorporated into the composite needle-punched structure.

Figure 9:
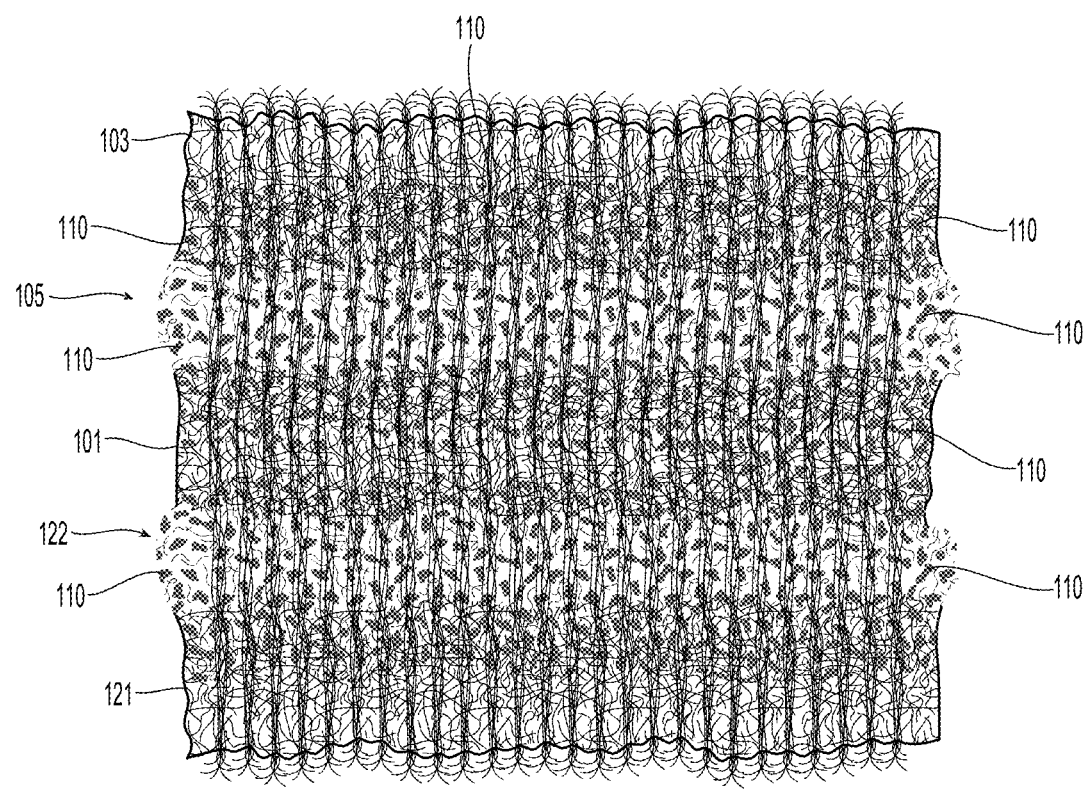
FIG. 9 is a schematic representation of an embodiment of a composite needle-punched textile product formed with two layers of ground recycled material encapsulated between three pre-needled tacked webs.

Referring to FIG. 9, in one embodiment, two layers of ground materials 105 and 122 containing fibers, pulp and particles 110 are encapsulated between three pre-needled tacked webs 101, 103 and 121. In one embodiment, the third pre-needled tacked web 121 and the second recycle layer 122 are added following the needling of first and second pre-needled tacked webs 101, 103 and the original layer of ground material 105. Alternatively, the third pre-needled tacked web 121 and the second recycle layer web 122 are added before needling the original composite or following the addition of heat and pressure to the original composite. As illustrated, the composite needle-punched structure of FIG. 9 is subjected to additional needling from both outer faces, accumulating a total density of needle penetrations of 80 to 160 penetrations/cm$^2$.

Vibration, blown air and suction can optionally be applied before needling the composite structure, after the deposition of the ground layers and before or after applying additional tacked webs, to move the fibers, pulp and particles 110 of the ground material partially into the various layers.

Figure 10:
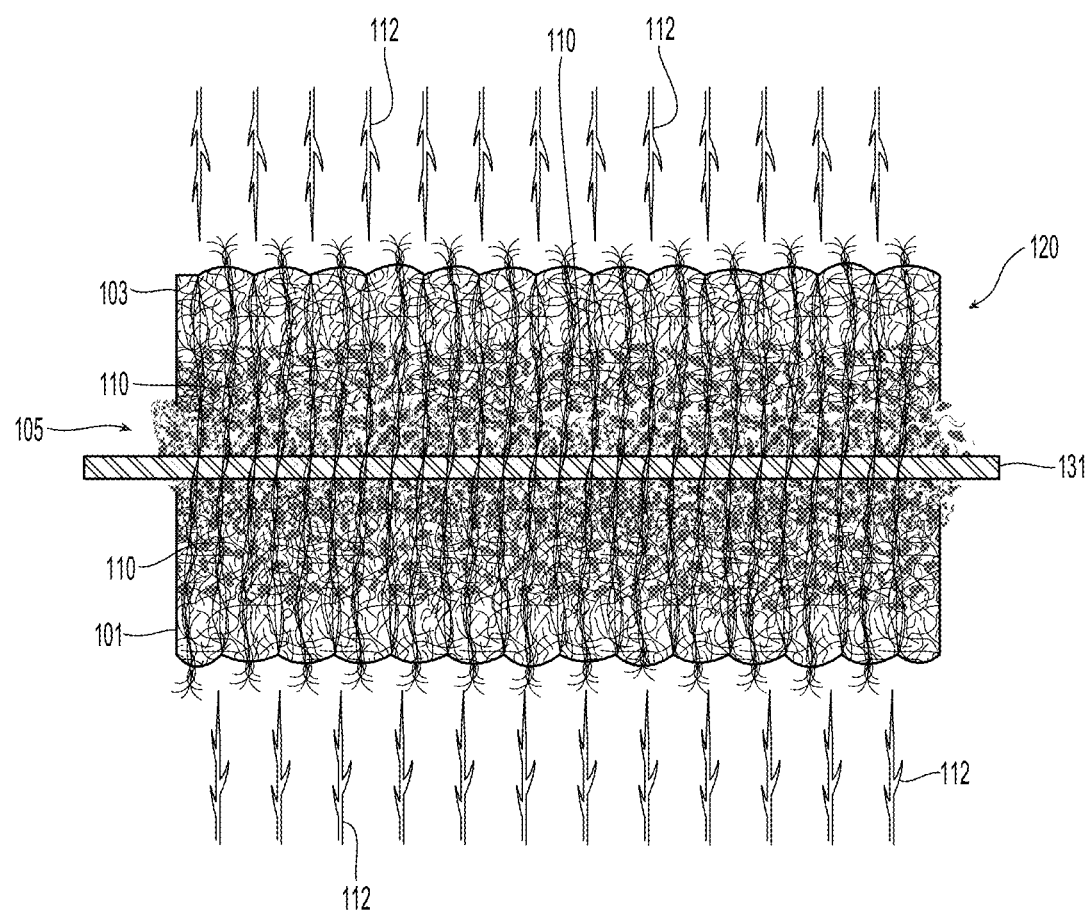
FIG. 10 is a schematic representation of an embodiment of the composite needle-punched textile product containing a reinforcing open layer.

Referring to FIG. 10, in one embodiment, a reinforcing open layer 131, e.g., an open textile layer, is incorporated into the needle-punched composite. In one embodiment, the reinforcing open layer is placed between the first pre-needled tacked web and the layer of ground material. In one embodiment, the reinforcing open layer is placed between the second pre-needled tacked web and the layer of ground material. Therefore, the reinforcing layer is inserted above the layer of ground material or below the layer of ground material. In addition, the reinforcing layer can be placed within the layer of ground material. Suitable reinforcing layers include, but are not limited to, open textile layers, a highly open woven of overlaid/bonded scrim and a highly open coarse-denier nonwoven filament layer. The reinforcing layer reinforces the composite needle-punched structure without impeding propagation of the ground material into the outer tacked web layers.

EXAMPLES

An existing composite felt backing was recycled by grinding and incorporated into a composite needle-punched structure in accordance with the methods discussed herein. The components and content of the textile product that was processed by grinding and introduced by scattering between two specially prepared tacked webs are listed below in Table 1. As shown, the original textile product had an overall low melt content of 20.3%, that included short fibers, particles, and powder

TABLE 1

Contents of the Existing Recycled Textile Product

| Component | Total Weight oz/yd$^2$ | Low Melt % | Low Melt. oz/yd$^2$ |
|---|---|---|---|
| Felt Backing | 30 | 5% | 1.5 |
| Adhesive Film | 4.8 | 100% | 4.8 |
| Adhesive Film | 2.7 | 100% | 2.7 |
| Yarn | 6.8 | 0 | 0 |
| Totals | 44.34 | 20.3% | 9 |

A series of trials were conducted using recycled material weights ranging from 2.0 oz/yd$^2$ to 9 oz/yd$^2$, combined with upper and lower tacked webs each weighing approximately 12.8 oz/yd$^2$, which corresponded to a range of 7% to 30% recycled content. The ground material in all trials was successfully dispersed into the surrounding tacked webs. In one particular trial, recycled material weighing 4.5 oz/yd$^2$ was introduced between the two tacked webs and subjected to additional needling as discussed herein. The new composite needle-punched structure had a 15% recycled content as illustrated in Table 2. Adding 4.5 oz/yd$^2$ of fine ground recycled material to two layers of 12.8 oz/yd$^2$ tacked webs produced a new composite needle-punched structure that can replace the original felt backing with a weight ratio of 4.5/30 or 15% recycle content, and a 7.3% low-melt content versus a low-melt content of 5% in the original felt backing. After applying heat to activate the low melt content, the new composite felt backing had approximately the same thickness and cushion as the original felt backing. There was no tendency of the fine fibers, pulp and particles in the recycled layer to fall off, either through the surfaces or at the cut edges, and either before or after applying heat.

TABLE 2

Composition of the New Composite Felt Backing

| Component | Total oz/yd$^2$ | Low Melt % | Low Melt oz/yd$^2$ |
|---|---|---|---|
| Top Tacked Web | 12.8 | 5% | 0.64 |
| Recycle Layer | 4.5 | 20.3% | 0.91 |
| Bottom Tacked Web | 12.8 | 5% | 0.64 |
| New Composite Felt Backing | 30.0 | 7.3% | 2.2 |

Exemplary embodiments facilitate a wide range of adjustments. For example, increasing low-melt content increases stiffness and delamination resistance. To produce a mergeable composite felt that can replace the original felt backing, for example, in the textile product described in Table 1, one or more of recycled content, needle density, needle type, penetrations/cm$^2$ and needling stroke depth had to be adjusted. The physical properties of the resulting composite needle punched felt that matches the corresponding physical properties of the original felt included resiliency, maintenance of thickness after compression, planar stiffness, abrasion resistance, delamination resistance, sharpness of embossed surface, and dimensional stability with changes in temperature. Balancing the process used in creating the new composite needle-punched structure as described herein generated a new composite 23% recycled content.

Exemplary embodiments introduce an overall recycled content from 5% to 40%, without producing a commercially noticeable difference in the appearance or function of the composite needle-punched structure. Dispersing the recycled content uniformly throughout the needle-punched structure binds all fibers together to a greater degree. In addition, the location of the recycled content between the top and bottom surfaces in the final composite needle-punched structure also affects physical properties. For example, bending stiffness increases by increasing low melt content, but increasing low melt content also reduces cushion. Concentrating the low melt material near the middle of the composite needle-punched structure increases bending stiffness and preserves cushion but reduces dimensional stability with changes in temperature or humidity. Centering the location of the ground material within the composite needle-punched structure also decelerates adhesive activation due the insulative effect of the upper and lower needle-punched layers when heat is applied from above and reduces the impact on cushion and flexibility by not impacting the upper pre-needled tacked web at all and the lower pre-needled tacked web minimally, depending upon needle density. Exemplary embodiments facilitate the production of felts containing high percentages of recycled material mergeable with felts produced with virgin materials or low recycled content.

Exemplary embodiments are also directed to composite needle-punched structures including composite needle-punched structures. Exemplary embodiments are also directed to needle-punched structures made in accordance with the methods for making a composite needle-punched structure described herein. The composite-needle punched structures can include all of the various embodiments of layers, components and materials and can made in accordance with the various embodiments of methods described herein. In general, the composite needle-punched structure is multi-layered structure containing webs of fibers and ground material including power. The ground material includes recycled materials including recycled textile products. In one embodiment, the resulting composite structure functions as a composite felt or a recycled composite felt that can be used as a new raw material, for example, replacing felt, in forming new textile products.

In one embodiment, the composite needle-punched structure includes a first needle-punched web containing and formed from a first layer of fibers, and a second needle-punched web containing and formed from a second layer of fibers. The first and second needle-punched webs are formed from layers of fibers using needle-punching as described herein. In one embodiment, the first layer of fibers has a resulting first needle punching density of 40 to 80 penetrations/cm$^2$, and the second layer of fibers has a resulting second needle punching density of 40 to 80 penetrations/cm$^2$. In addition, the first layer of fibers and the second layer of fibers each contain at least 5% low melting content and have a weight of from about 5 oz/yd$^2$ to about 25 oz/yd$^2$.

The composite needle-punched structure includes a layer of ground material disposed between the first needle-punched web and the second needle-punched web. Suitable ground materials as described herein and include ground and recycled textile products. In one embodiment, the layer of ground material has a low-melt content greater than 1%. In one embodiment, the layer of ground material includes fibers having fiber lengths up to about 0.125 inches. In one embodiment, the layer of ground material is disposed in the composite needle-punched structure in a total weight of from about 2 oz/yd$^2$ to about 20 oz/yd$^2$.

At least a portion of the ground material is dispersed into the first layer of fibers in the first needle-punched web and the second layer of fibers in the second needle-punched web towards a first needle-punched web outer surface and a second needle-punched web outer surface. In one embodiment, the ground material is dispersed in the first and second needle-punched webs by needle-punching. In one embodiment, the composite needle-punched structure has a resulting needle punching density of 80 to 160 penetrations/cm$^2$. In one embodiment, the composite needle-punched structure has an overall recycle content of from 5% to 40%.

In addition to two needle-punched webs and a single layer of ground material, exemplary embodiments are also directed to composite needle-punched structures that utilize at least three layers of needle-punched webs and at least two layers of ground material. Each layer of ground material is disposed between two adjacent needle-punched webs, and the layer of ground material is dispersed into the surrounding needle-punched webs, for example, by needle-punching the entire composite structure as described herein. In one embodiment, at least one additional needle-punched web containing and formed from an additional layer of fibers and am addition layer of ground material for each additional needle-punched web is added to the composite needle-punched structure containing the first and second needle-punched webs. Each additional needle-punched web and additional layer of ground material is incorporated into the composite needle-punched structure such that each additional layer of ground material is disposed between two needle-punched webs. A portion of the ground material of each additional layer of ground material is dispersed into the layer of fibers in the two needle-punched webs.

The foregoing written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for forming a composite needle-punched structure, the method comprising:
    forming a first needle-punched web by needling a first layer of fibers;
    forming a second needle-punched web by needling a second layer of fibers;
    depositing a layer of ground material onto the first needle-punched web, wherein a portion of the ground material has a lower melting temperature than a remaining portion of the ground material, and wherein the portion having the lower melting temperature comprises more than 1% by weight of the ground material;
    placing the second needle-punched web on the layer of ground material such that the layer of ground material is disposed between the first needle-punched web and the second needle-punched web;
    performing additional needling through the first needle-punched web, the second needle-punched web, and the layer of ground material from a first needle-punched web outer surface or a second needle-punched web outer surface or both the first needle-punched web outer surface and the second needle-punched web outer surface, the additional needling sufficient to disperse at least a portion of the ground material into the first needle-punched web and the second needle-punched web towards the first needle-punched web outer surface and the second needle-punched web outer surface, wherein the additional needing is performed with long needle strokes in the range of 10 to 15 mm resulting in an average number of needle barb passages though the composite needle-punched structure in the range of 4 to 8 barbs per needle stroke, and a density of 80 to 160 penetrations/cm$^2$; and
    applying, subsequent to the additional needling, heat to activate the portion of the ground material having a lower melting temperature and to secure the composite needle-punched structure.

2. The method of claim 1, wherein:
    at least 5% by weight of the first and second layers of fibers comprises material having a lower melting temperature than a remaining portion of the first and second layers of fibers;
    the first layer of fibers and the second layer of fibers each have a weight of from about 5 oz/yd$^2$ to about 25 oz/yd$^2$;
    the first layer of fibers is needled with a first needle punching density of 40 to 80 penetrations/cm$^2$; and
    the second layer of fibers is needled with a second needle punching density of 40 to 80 penetrations/cm$^2$.

3. The method of claim 1, wherein the layer of ground material comprises a layer of ground textile fibers.

4. The method of claim 1, wherein the method further comprises applying pressure in combination with applying heat or applying pressure after applying heat.

5. The method of claim 4, wherein applying heat and applying pressure comprise applying both heat and pressure from the first needle-punched web outer surface or the second needle-punched web outer surface or both the first needle-punched web outer surface and the second needle-punched web outer surface.

6. The method of claim 1, wherein applying heat comprises applying heat in an oven, applying heat in a fabric finishing range, applying heat in a blanket laminator or applying heat in a dual belt laminator.

7. The method of claim 1, wherein a portion of the first needle-punched web and a portion of the second needle-punched web each comprise material having a lower melting temperature than a remaining portion of the first needle-punched web and the second needle-punched web, respectively, and wherein the portion of the first needle-punched web and of the second needle-punched web having the lower melting temperature each comprise more than 1% by weight of the first needle-punched web and of the second needle-punched web, respectively.

8. The method of claim 1, wherein a portion the first needle-punched web and a portion of the second needle-punched web each comprise material having a lower melting temperature than a remaining portion of the first needle-punched web and the second needle-punched web, respectively, and wherein the portion of the first needle-punched web and of the second needle-punched web having the lower melting temperature each comprise between about 5% to about 40% by weight of the first needle-punched web and of the second needle-punched web, respectively.

9. The method of claim 1, wherein:
the first needle-punched web comprises a first thickness;
the second needle-punched web comprises a second thickness; and
the first thickness and the second thickness are each in a range from about 0.04 inches to about 0.40 inches.

10. The method of claim 1, wherein a portion of the first needle-punched web and a portion of the second needle-punched web each comprise from about 5% to about 25% by weight of bicomponent fibers, wherein the bicomponent fibers are comprised of 50% by weight of material having a lower melting point than a remaining 50% by weight of fibers.

11. The method of claim 1, wherein the portion of ground material having a lower melting temperature comprises more than about 5% by weight of the ground material.

12. The method of claim 1, wherein the portion of ground material having a lower melting temperature comprises from about 1% to about 40% by weight of the ground material.

13. The method of claim 1, wherein the layer of ground material comprises a total weight of greater than about 2 oz/yd$^2$.

14. The method of claim 1, wherein the layer of ground material comprises a total weight of from about 2 oz/yd$^2$ to about 20 oz/yd$^2$.

15. The method of claim 1, wherein the method further comprises blending additional ground material into the layer of ground material before depositing the layer of ground material onto the first needle-punched web.

16. The method of claim 15, wherein the additional ground material comprises plastic bottle waste, low-melting freeze ground films, commercial low-melting adhesive powders or particles, active particulate material, nonactive particulate material or combinations thereof.

17. The method of claim 1, wherein the layer of ground material comprises fiber lengths up to about 0.125 inches.

18. The method of claim 1, wherein:
the first needle-punched web comprises a first needle exit side from which fibers from the first layer of fibers extend;
the second needle-punched web comprises a second needle exit side from which fibers from the second layer of fibers extend;
depositing the layer of ground material comprises depositing the layer of ground material on the first needle exit side; and
placing the second needle-punched web comprises placing the second needle exit side on the layer of ground material.

19. The method of claim 1, wherein the method further comprises applying at least one of air, vibration and suction to the first needle-punched web, the second needle-punched web and the layer of ground material to move fibers, pulp or particles in the ground material into the first needle-punched web and the second needle-punched web.

20. The method of claim 1, wherein the ground material comprises fibers, pulp, and particles, and performing additional needling further comprises performing a sufficient amount of additional needling to disperse a majority of the fibers, pulp, and particles in the ground material into the first needle-punched web and the second needle-punched web.

21. The method of claim 1, wherein the method further comprises placing an additional layer on the composite needle-punched structure.

22. The method of claim 21, wherein the additional layer comprises a functional layer or a decorative fabric layer.

23. The method of claim 1, wherein the method further comprises embossing the composite needle-punched structure with a three-dimensional pattern using pressure and heat.

24. The method of claim 1, wherein:
the method further comprises:
forming at least one additional needle-punched web by needling an additional layer of fibers;
depositing an additional layer of ground material on each additional needle-punched web; and
incorporating each additional needle-punched web and additional layer of ground material into the composite needle-punched structure; and
performing additional needling comprises performing additional needling through the first needle-punched web, the second needle-punched web, the layer of ground material, and each additional needle-punched web and each additional layer of ground material.

25. The method of claim 1, wherein depositing the layer of ground material further comprises depositing a plurality of superposed layers of ground material.

26. The method of claim 1, wherein the method further comprises placing an open textile layer between the first needle-punched web and the layer of ground material or between the second needle-punched web and the layer of ground material.

27. The method of claim 1, wherein the composite needle-punched structure comprises an overall recycle content of from 5% to 40% by weight.

* * * * *